(12) United States Patent
Liang et al.

(10) Patent No.: US 7,388,714 B2
(45) Date of Patent: Jun. 17, 2008

(54) INDEPENDENT FOCUS COMPENSATION FOR A MULTI-AXIS IMAGING SYSTEM

(75) Inventors: Chen Liang, Tucson, AZ (US); Artur G. Olszak, Tucson, AZ (US)

(73) Assignee: DMetrix, inc., Tucson, AZ (US)

( * ) Notice: Subject to any disclaimer, the term of this patent is extended or adjusted under 35 U.S.C. 154(b) by 0 days.

(21) Appl. No.: 10/610,215

(22) Filed: Jun. 30, 2003

(65) Prior Publication Data

US 2004/0051940 A1 Mar. 18, 2004

Related U.S. Application Data

(60) Provisional application No. 60/412,615, filed on Sep. 18, 2002.

(51) Int. Cl.
*G02B 27/14* (2006.01)
(52) U.S. Cl. ............... 359/637; 359/625; 359/626; 359/634; 359/656; 359/670
(58) Field of Classification Search ........ 359/618–622, 359/634, 637, 625–626, 368, 372, 656, 670; 257/229, 294, 432
See application file for complete search history.

(56) References Cited

U.S. PATENT DOCUMENTS

| | | | |
|---|---|---|---|
| 4,953,962 A | | 9/1990 | Esswein et al. |
| 5,444,573 A | | 8/1995 | Saito |
| 5,616,912 A | * | 4/1997 | Robinson et al. ........ 250/201.1 |
| 5,917,260 A | | 6/1999 | Garcia et al. |
| 5,978,155 A | | 11/1999 | Suenaga |
| 6,040,591 A | * | 3/2000 | Otsuka ........................ 257/232 |
| 6,517,665 B1 | | 2/2003 | Boehme et al. |
| 6,836,612 B2 | * | 12/2004 | Morris et al. ............... 385/147 |

OTHER PUBLICATIONS

H. Guckel, K.J. Skrobis, T.R. Christenson, J. Klein, Wisconsin Ceenter for Applied Microelectronics, Micromechanics for Actuators Via Deep X-ray Lithography (Invited Paper), SPIE vol. 2194, pp. 2-9.

(Continued)

*Primary Examiner*—Hung X. Dang
*Assistant Examiner*—Joseph Martinez
(74) *Attorney, Agent, or Firm*—Davis Wright Tremaine LLP; William A. Birdwell

(57) ABSTRACT

A multiple-axis imaging system having optical elements whose optimal image positions can be individually adjusted, comprising a plurality of optical array elements having respective optical axes and being individually disposed with respect to one another to image respective sections of an object; and a plurality of image position shifting devices corresponding to respective optical elements for separately establishing the image positions for a plurality of the optical array elements. The multi-axis imaging system preferably comprises a miniaturized microscope array. The shifting devices may comprise wavelength filters or optical-path-length-altering elements, such as a plane parallel plates. The devices may also comprise a pair of wedges that adjustably overlap one another, the wedges having apexes that point in opposite directions and respective corresponding planar surfaces that are parallel to one another. A method for separately adjusting the image positions of a plurality of optical elements in a multi-axis imaging system is also provided, particularly in an array microscope.

53 Claims, 6 Drawing Sheets

OTHER PUBLICATIONS

The MEMS Handbook, CRC Press (Sep. 2001), pp. 18-34 to 18-40.
Ernest J. Garcia, Todd R. Christenson, Marc A. Polosky, Andres A. Jojola, Sandia National Laboratories, "Design and Fabrication of a LIGA Milliengine," Transducers '97, International Conference on Solid-State Sensors and Actuators (9th 1997; Chicago, Ill.), IEEE, pp. 765-768.

* cited by examiner

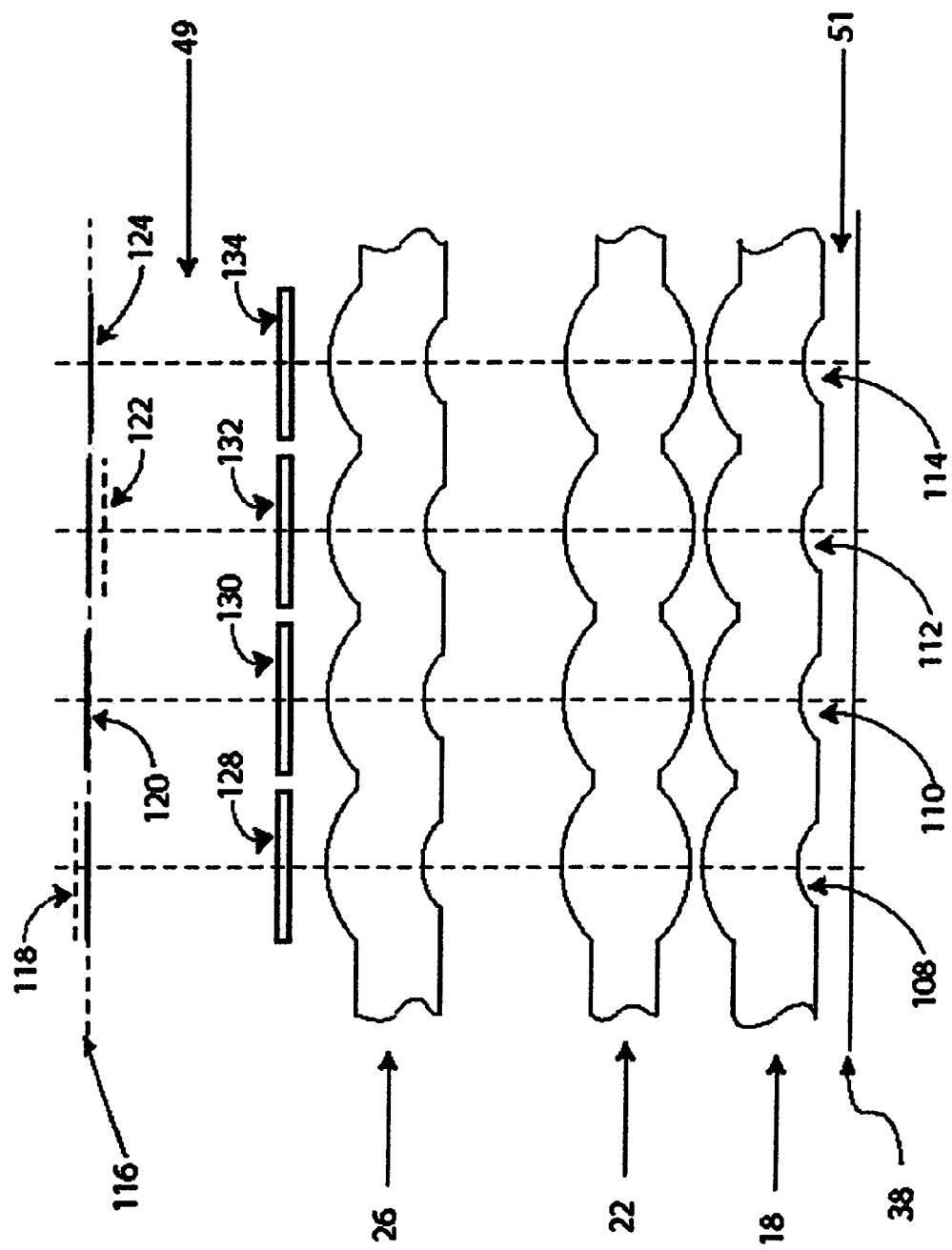

INDEPENDENT FOCUS COMPENSATION FOR A MULTI-AXIS IMAGING SYSTEM

CROSS REFERENCE TO RELATED APPLICATION

This application claims the benefit of priority under 35 U.S.C. § 119 to U.S. Provisional Application No. 60/412,615, filed Sep. 18, 2002, the entire contents of which are incorporated by reference.

BACKGROUND OF THE INVENTION

This invention relates to independent focus compensation for multi-axis imaging systems, and particularly to independent focus compensation for microscope arrays.

In a multi-axis imaging system, as that term is used herein, a plurality of optical elements are arranged in an array so as to have a fixed relationship to one another. One advantage of such a system is that all of the elements of the array may be moved in unison to scan an object so as to bring respective images of the object into focus at a desired image plane. In particular, in a miniature microscope array a plurality of miniature microscope objectives arranged in an array is employed instead of a single objective to scan a large field of the object more rapidly at high resolution than can be achieved with a single objective. Such a miniature microscope array is disclosed in PCT Patent Publication No. WO 02/075370, published Sep. 26, 2002. Where used to image a common specimen, a miniature microscope array is also referred to as an array microscope.

In a microscope array, the image sensors for each element of the array are preferably disposed on a single, substantially flat substrate so as to facilitate fabrication, assembly, and electrical connection. In that case, the axial positions of the sensors corresponding to each microscope element cannot be adjusted independently. However, fabrication and assembly errors in the optics will cause the positions of respective image planes of individual microscope elements of a microscope array to vary so as not to be substantially coplanar. In that case, where the respective object planes of the microscope elements are substantially coplanar, some of the images will not be co-planar with their respective image sensors, so the respective image sensors will detect a sub-optimally focused image. In principle, this problem may arise in any multi-axis imaging system having an array of sensors and corresponding optical elements. To avoid this problem, the lens surface shapes, lens thickness and lens separations of each element require extremely tight tolerances. However, such tolerances are difficult and expensive to achieve.

Accordingly, it would be desirable to have some means to compensate for differences in image plane position among the individual elements of a multi-axis imaging system, particularly an array microscope, so as to facilitate fabrication of such systems and ensure optimal focus of the images of all of the individual array elements.

SUMMARY OF THE INVENTION

The present invention overcomes the aforementioned problems and meets the aforementioned need by providing a multiple-axis imaging system having optical elements whose optimal image positions can be individually adjusted, comprising a plurality of optical array elements having respective optical axes and being individually disposed with respect to one another to image respective sections of an object; and a plurality of image position shifting devices corresponding to respective optical elements for separately establishing the image positions for a plurality of the optical array elements. In one embodiment, the system invention is particularly directed to a multi-axis imaging system that comprises a miniaturized microscope array.

In one embodiment of the invention one or more of the shifting devices comprise wavelength filters for selecting from among a range of illumination wavelengths a selected wavelength that achieves focus at a selected image position.

In another embodiment of the invention, one or more of the shifting devices comprises an optical-path-length-altering element, such as a plane parallel plate, disposed in the optical path of light propagating through a corresponding optical array element for altering the optical path length thereof.

In a further embodiment of the invention, the optical-path-length-altering element comprises a pair of wedges disposed in the optical axis of a corresponding optical array element so as to overlap one another, the wedges having apexes that point in opposite directions lateral to the optical axis of the corresponding optical array element and respective corresponding planar surfaces that are parallel to one another. In addition, the invention may be provided with an optical-path-length-adjustment system, such as a micro actuator, associated with the pair of wedges for varying the extent to which the wedges overlap one another.

The invention also provides a method for separately adjusting the image positions of a plurality of optical elements in a multi-axis imaging system, comprising inserting one or more image shifting devices into the optical axes of respective optical elements of the plurality of optical elements for separately establishing the image positions of a plurality of the optical elements. In one embodiment the method is particularly directed to use of the multi-axis imaging system as an array microscope.

The objects, features and advantages of the invention will be more fully understood upon consideration of the following detailed description of the invention taken in conjunction with the accompanying drawings.

BRIEF DESCRIPTION OF THE DRAWINGS

FIG. 6 is a cross section of an array microscope of the type illustrated in FIG. 1, wherein the images for a plurality of the optical elements are located at a different axial positions than for the other elements due to fabrication or assembly error, and the image positions are shifted to the same plane by insertion of wavelength filters in accordance with the present invention.

DETAILED DESCRIPTION OF THE INVENTION

Although the present invention may be applicable to a variety of multi-axis imaging systems, it is particularly advantageous in an array microscope wherein a plurality of miniature microscopes are arranged in an array so as to image respective portions of a common specimen. Accordingly, while the invention is hereafter described in terms of a miniature microscope array, particularly used as an array microscope, it is to be understood that any multi-axis imaging system may fall within the scope of this invention.

Figure 1:
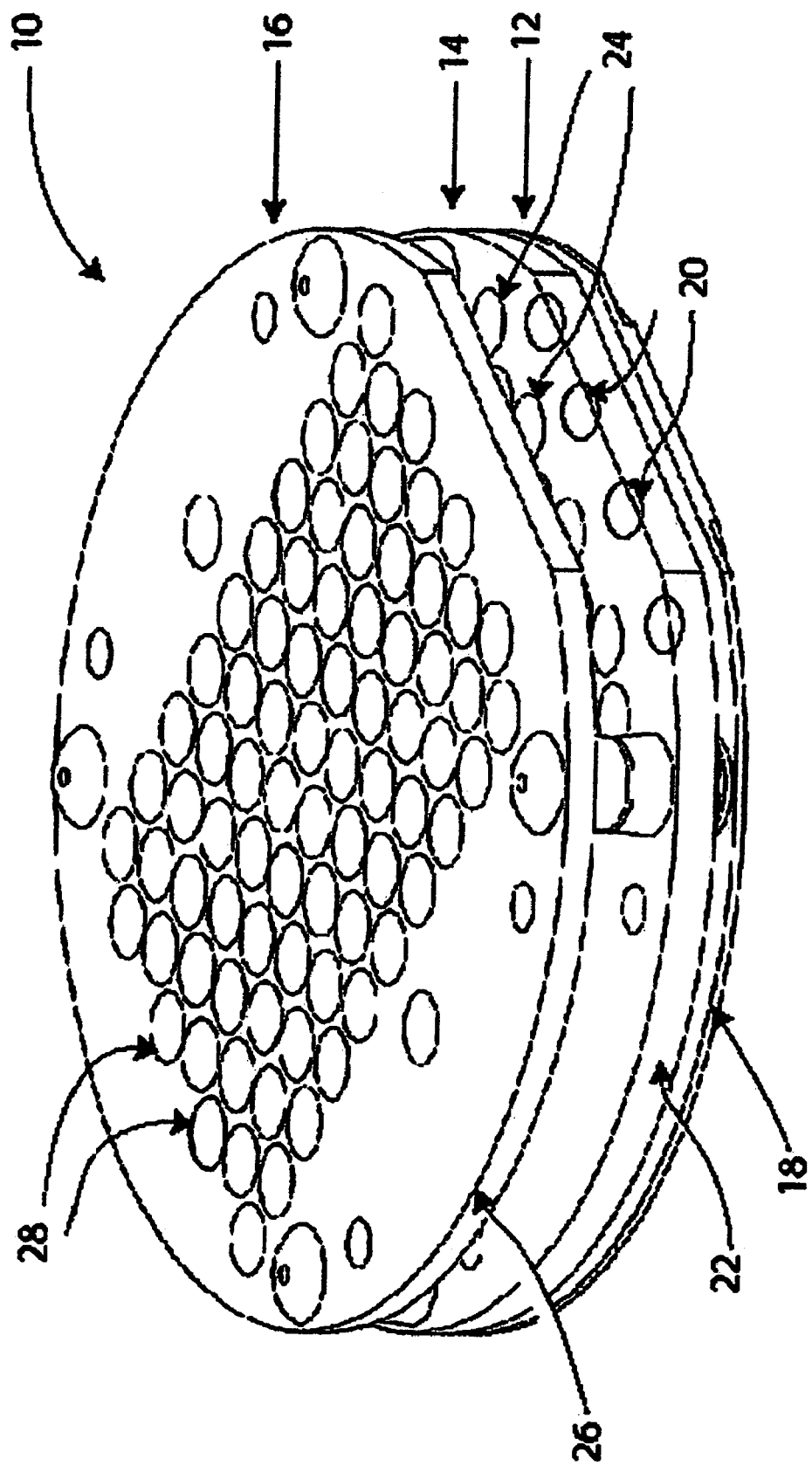
FIG. 1 is an illustration of an array of optical elements for an array microscope.

An exemplary miniature microscope array 10 is shown in FIG. 1. It comprises three sub-arrays, 12, 14 and 16, each comprising a substrate and one of three respective lenses for each of the optical elements of the microscope array 10. Thus, for each element of the microscope array, substrate 18 supports a bottom lens 20; substrate 22 supports a middle lens 24; and substrate 26 supports a top lens 28; and the respective lenses of each of the three sub-arrays are, ideally, aligned with one another along respective optical axes. The lenses may be formed as an integral part of the substrate, or may be discrete elements mounted on their respective substrates. In any case, they have previously had fixed positions on their respective substrates, which have had fixed positions with respect to one another.

Figure 2:
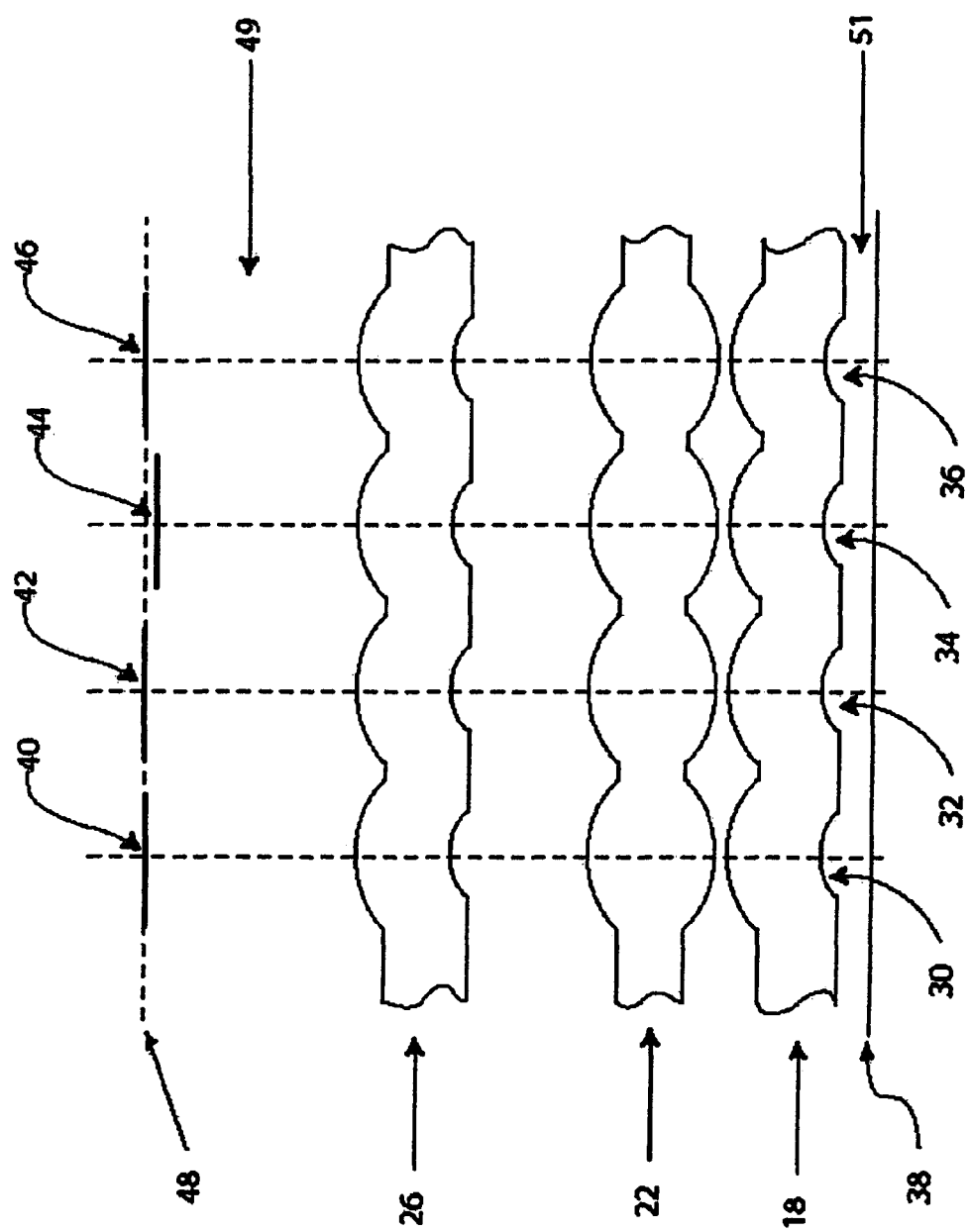
FIG. 2 is a cross section of an array microscope of the type illustrated in FIG. 1, wherein the image for one of the optical elements is located at a different axial position than for the other elements due to fabrication or assembly error.

A cross section of a portion of an array microscope of the type shown in FIG. 1 is shown in FIG. 2. This portion comprises four microscope array elements 30, 32, 34 and 36 formed by lenses 20, 24, and 28 of stacked substrates 18, 22 and 26, respectively. An object 38 is imaged by the array microscope and the images 40, 42, 44 and 46 produced by microscope array elements 30, 32, 34 and 36, respectively, are detected by an electronic photosensor array 48. The images formed by the individual microscope array elements may be located at different axial positions from one another, as illustrated by image 44 formed by element 34, due to fabrication and assembly errors in the microscope array. Where the photosensor array and lens arrays are fixedly disposed on respective single substrates, adjustment of the axial position of a substrate to bring one array element into focus will defocus at least one other element.

The present invention provides compensation for image surface variations among the array elements by moving the image surface of individual microscope elements without moving either the sensor substrate or the lens array substrates. In one embodiment of the invention, the optical path length ("OPL") of individual microscope elements is modified so as to place the optimal image surfaces of individual microscope elements at the sensor surface. In another embodiment of the invention, wavelength selection is used to place the image surface of a selected wavelength at the sensor surface by taking advantage of axial chromatic aberration.

Figure 3:
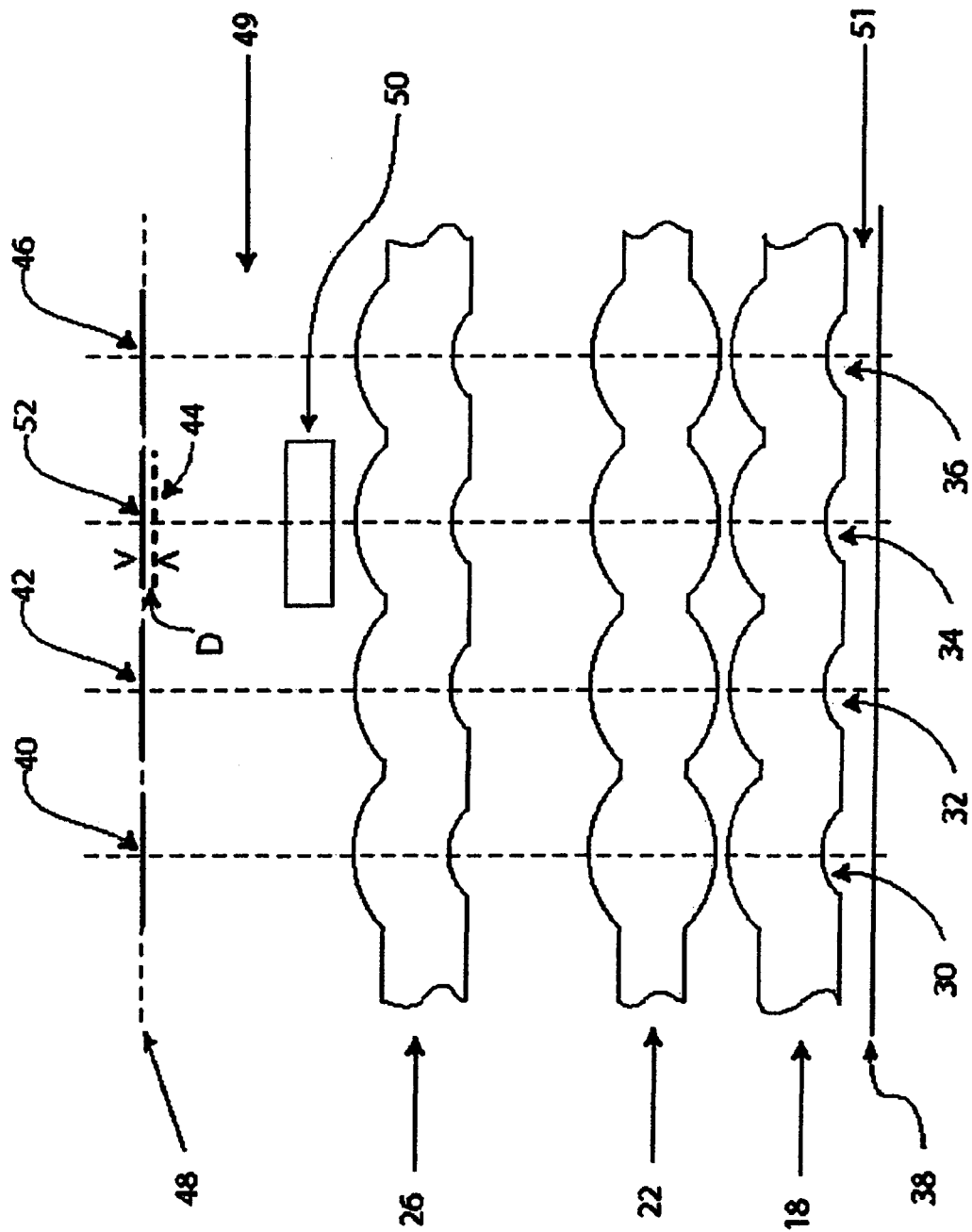
FIG. 3 is a cross section of the array microscope of FIG. 2, wherein the image position of the one element has been shifted by placement of a plane parallel plate compensator in the optical path thereof in accordance with the present invention.

Turning now to FIG. 3, the OPL of an array element can be changed by inserting into the optical path a compensator comprised of a medium having an index of refraction different from the medium in which the array is immersed, typically air, which changes the OPL between the object and the image. This, in turn changes the position of the image produced by the element. Preferably, this is accomplished by inserting a plane parallel plate 50 in the optical path of an array element, for example element 34, so that the axial position of the image surface is changed. The plane parallel plate may be made of any appropriate optical material, such as glass, having an index of refraction that is different from the medium in which it resides. Where the index of the plane parallel plate is greater than the index of the medium in which the array microscope is immersed, the image distance will be increased. Where the index of the plane parallel plate is less than the medium in which the array microscope is immersed, the image distance will be decreased. In principle, a compensator may be inserted either in the image space 49 or the object space 51 of the microscope array element. However, in most cases it would preferably be inserted in the image space because of the greater physical space available for receiving the compensator. Preferably, anti-reflection coatings are disposed on the optical surfaces of each plane parallel plate to maximize light transmission.

OPL is related to physical distance, d, by the index of refraction, n, of the medium in which light is traveling, as follows:

$$OPL = n*d$$

In general, the axial translation of a microscope image $\Delta$ depends on the index of the medium in which the image space of the microscope array is immersed, the index of the plane parallel plate, and the thickness of the plane parallel plate, as follows:

$$\Delta = t*(n_p - n_m)/n_p$$

Where $n_p$ is the index of the plane parallel plate, and $n_m$ is the index of the medium in which the image space of the microscope array is immersed. Most often the image space of the microscope array is immersed in air, so that:

$$\Delta = t*(n_p - 1)/n_p$$

For example, the image plane of microscope element 34 in FIG. 2 falls short of the sensor plane 40 by distance D. Assuming that the image space of the microscope is immersed in air, the image plane can be adjusted to coincide with the sensor substrate plane 40 by inserting a plane parallel plate of index $n_p$ and thickness t, such that:

$$D = t*(n_p - 1)/n_p$$

Thus, in FIG. 3, it can be seen that the image plane for microscope element 34 has shifted from position 46 to position 52.

Figure 4:
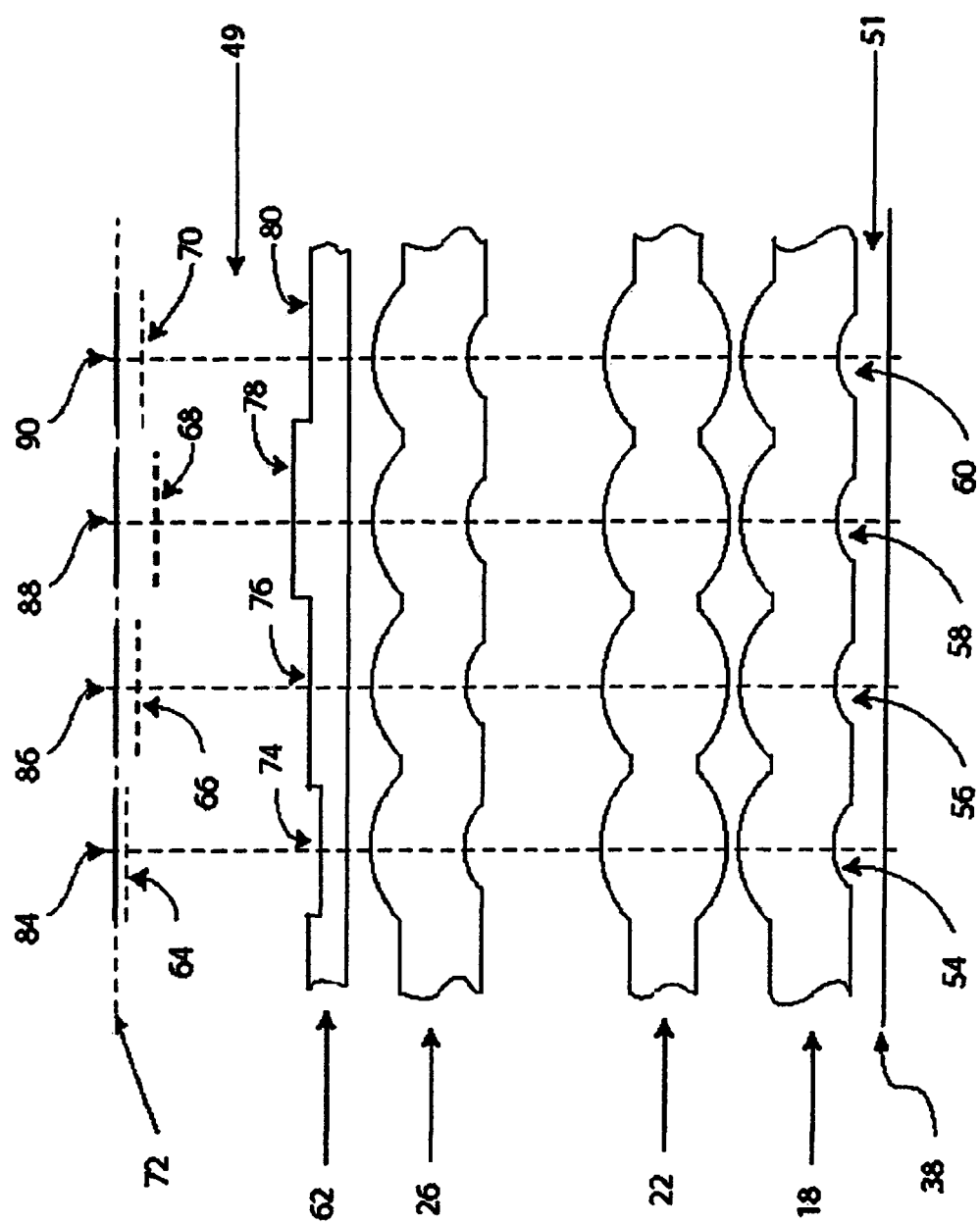
FIG. 4 is a cross section of an array microscope of the type illustrated in FIG. 1, wherein the images for a plurality of the optical elements are located at a different axial positions than for the other elements due to fabrication or assembly error, and the image positions are shifted to the same plane by insertion of a compensator having different thickness at different areas corresponding to respective optical elements according to the present invention.

If more than one microscope element in the array microscope requires focus compensation then a compensator, preferably a plane parallel plate, is needed for each such element. Alternatively, the compensators can be formed in a monolithic piece, as shown in FIG. 4. There are two reasons for using such a monolithic plate, as distinguished from discrete parallel plates. First, a monolithic plate can be more easily assembled. Once the monolithic plate is made there is only one compensator element that needs to be inserted into the array microscope. Second, a monolithic plate can be designed to introduce a nominal image shift for every element. Preferably, anti-reflection coatings are disposed on the optical surfaces of the monolithic plate to maximize light transmission, and also on support surfaces to reduce stray light from reflections.

This allows the monolithic compensator plate to compensate focus in both directions. In practice, some of the microscope elements that require focus compensator may have image planes whose position is in back of, rather than in front of, the sensor plane. As a practical matter, where the array microscope is immersed in air, the image can only be shifted away from the microscope element because there is no practical material that has index of refraction less than 1.0. This means that compensators must be placed in the optical paths of all other microscope elements to translate all of their images to a common plane.

FIG. 4 shows another cross section of a portion of an array microscope of the type shown in FIG. 1 comprising four different microscope array elements 54, 56, 58 and 60 whose images 64, 66, 68 and 70, respectively, would be formed at respectively different axial positions but for the inclusion of a monolithic compensator plate 62. It can be seen that in this case, images 64 and 68 must be shifted in order to be formed at a common sensor plane.

The nominal thickness of the monolithic compensator plate 62 introduces a nominal image shift of the images for all of the microscope array elements. The image sensor 72 is placed at a corresponding nominal position to account for the nominal shift. The shifting areas 74, 76, 78 and 80 on the compensator plate corresponding to microscope array elements 54, 56, 58 and 60 each shift respective images to positions 84, 86, 88 and 90. In this example, the shift may be nominal, as is the case for microscope array elements 56 and 60, or may be to compensate for focus error, as is the case for microscope elements 54 and 58. An effective compensating area can be either a protrusion from the compensator plate, as is the case for elements 78 and 80, or a recess, as the case for element 74. Thus, the monolithic compensator plate offers the advantage of bi-directional compensator so that the image plane of a microscope can be shifted either toward or away from its nominal position.

To fabricate appropriate compensator plates, the image locations for each microscope array element must be known. These locations can be modeled using ray trace software such as, for example, ZEMAX®, if the fabrication and assembly errors are known. Preferably, however, the actual image positions are measured experimentally after the array microscope is constructed. Once the image positions for every microscope element are known, the compensator plate thickness for each microscope can be calculated, as described above, or, preferably, modeled using ray trace software as is commonly understood in the art.

Compensator plates may be made of any appropriate material, such as glass, plastic, sol-gel or crystal. They may be fabricated by any appropriate method, such as single point diamond turning, molding or lithographic techniques. Preferably, the compensator plates are coated with an anti-reflection coating so as to increase light throughput and reduce stray light.

While the foregoing description has been in terms of image space and plane parallel plate compensators, it is to be recognized that other spaces may be used and that the compensators do not necessarily need to be plane parallel plates. Moreover, as described hereafter, the compensators need not be fixed or passive devices.

Figure 5:
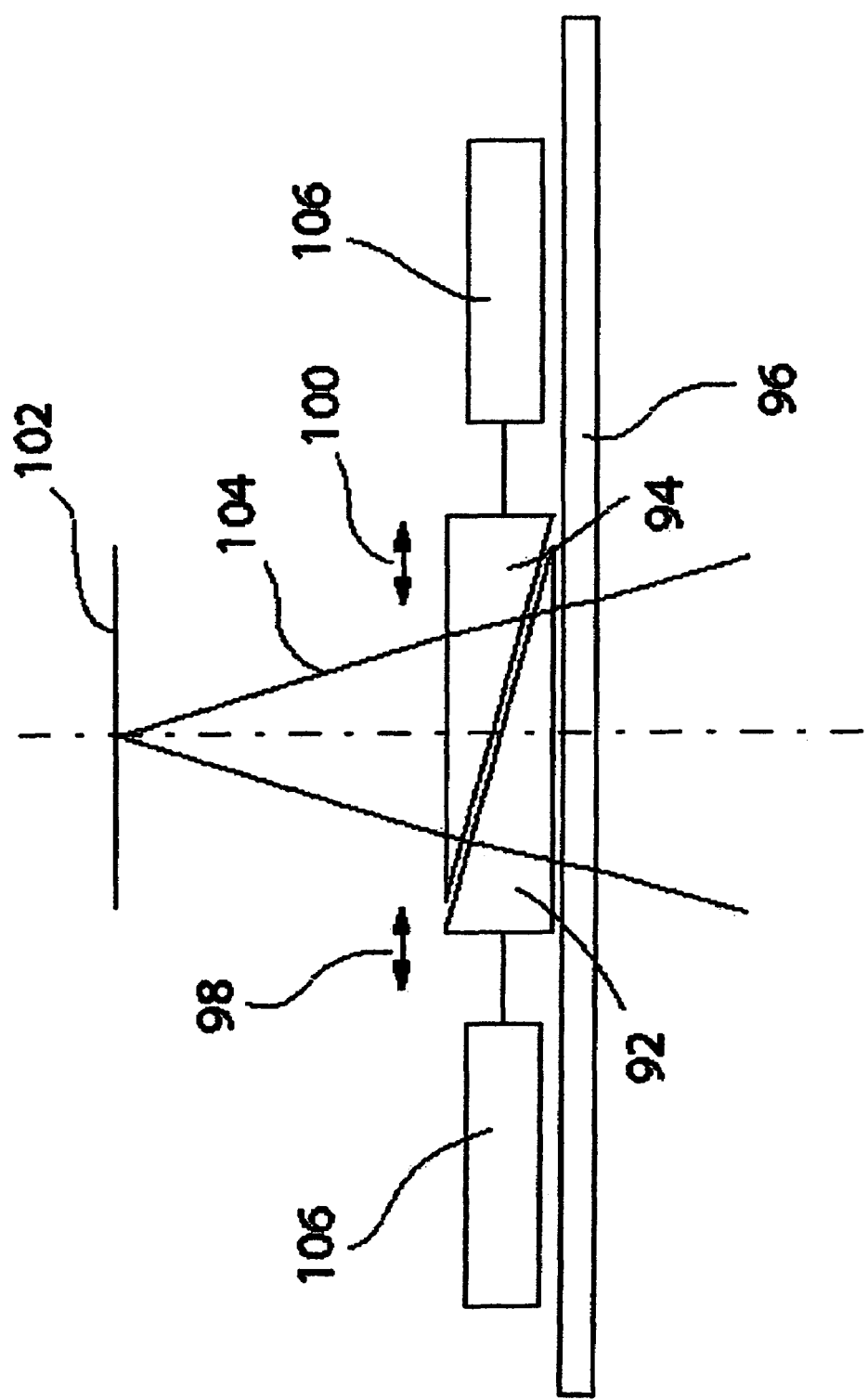
FIG. 5 illustrates an optical path length adjustment device for use with an individual microscope array element in accordance with the present invention.

A further refinement of the invention is the use of compensators that are individually adjustable to vary the axial positions of the images of respective microscope array elements. This can be achieved, for example, by utilizing two optical wedges 92 and 94 movably mounted on a common transparent substrate 96 such that together they form a plane parallel plate, as shown in FIG. 5. By moving the two wedges toward and away form one another, as shown by arrows 98 and 100, the thickness of the plane parallel plate that they form, and the position of the corresponding image 102 formed by the light beam 104 passing therethrough, can be varied. This phenomenon is well known in the art. See, for example, Rudolf Kingslake, "Lens Design Fundamentals," Academic Press, New York, 1978, pp.119-120. Preferably, the two parallel optical surfaces of the wedge pair have anti-reflection coatings disposed thereon to maximize light transmission.

The wedges 92 and 94 can be moved toward or away from each other by means of a pair of actuators 106. These actuators convert a driving signal, such as an electrical signal in the form of current or voltage, to a lateral translation of the wedges, so that the total optical thickness of the assembly changes. Many technologies are available to produce actuators 106 suitable for this application. See, for example, "The MEMS Handbook," Mohamed Gad-el-Hak Ed., CRC Press, New York, N.Y., 2001. One of the most promising is a technology known in the art as a LIGA process which permits the manufacture of actuators that can deliver up to 1 mm of travel, sufficient to fulfill the axial displacement requirements for independently adjusting the focal length of each microscope in the array of the invention. The LIGA process is described, for example, in U.S. Pat. Nos. 6,517,665 and 6,332,568, hereby incorporated by reference in their entireties.

The use of individually adjustable compensators permits precise adjustment of image positions in an assembled array microscope, thereby ensuring that errors in fabrication of the compensators themselves and variations from flatness of the sensor array, as well as errors in the fabrication and assembly of the microscope array elements, can be compensated. In addition, variations object plane flatness and object thickness may be compensated on a dynamic basis.

The second way of independently compensating for focusing error as result of fabrication and assembly error of individual microscope array elements is to take advantage of the axial chromatic aberration of the microscope elements and operate each microscope array element at a specific wavelength that forms a focused image at the plane of the image sensor. The operating wavelength for the elements that need compensation is slightly different from the nominal design wavelength for the elements that do not need compensation. This approach takes advantage of the fact that miniature microscope objectives designed for an array microscope are not necessarily corrected for axial chromatic aberration. Instead, different wavelengths focus at different axial locations and this axial chromatic aberration can be used to compensate for focus error.

Each microscope array element is illuminated with a source of extended spectral light. A corresponding narrow spectral band filter is placed in front of the image sensor for each microscope array element. If there is no variation in image location then the narrow band filter for all of the microscope array elements is the same. However, if there are variations in image location among the microscope array elements then different narrow band spectral filters are needed for various respective microscope array elements.

For example, as shown by the group of microscope array elements 108, 110, 112 and 114 in FIG. 6, if the image position of one element is behind the nominal position of the sensor substrate plane 116 for a reference wavelength, as is the case for element 108 and image 118, for most of cases a shorter wavelength filter 128 is used to shift the image plane for that element back to the sensor plane. On the other hand, if the image position of one element is in front of the nominal position of the sensor substrate plane 116, as is the case for element 112 and image 122, for most of cases a longer wavelength filter 132 is used to shift the image plane for that element forward to the sensor plane. The image positions of elements 110 and 114 are placed at the nominal sensor substrate plane 116 by respective narrow band filters 130 and 134 whose center wavelengths are the nominal wavelength.

Based on ray trace or other mathematical modeling of the individual microscope array elements together with knowledge of the fabrication and assembly errors, or on experimental determination of the individual image positions for the nominal wavelength, as described above, the center wavelengths for each of the filters for respective microscope array elements can be determined. Appropriate narrow band filters, such as thin film optical filters or etalons, may be constructed as is commonly know in the art. The filters may be constructed as discrete elements and mounted on a common substrate, or may be individually formed on a common substrate.

The terms and expressions that have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

The invention claimed is:

1. A multi-axis imaging system, comprising:
a plurality of optical imaging elements arranged in an array, the imaging elements being microscopes having respective optical axes and being individually disposed with respect to one another to image respective sections of an object such that at least two distinct points within each said section of the object are mapped by the respective microscope to corresponding distinct points in the image produced by the respective microscope; and
a plurality of image position shifting elements corresponding to respective said microscopes for achieving different optical path lengths along the optical axes of respective said microscopes so as to establish the image positions thereof.

2. The imaging system of claim 1, wherein said plurality of microscopes comprises a miniature microscope array.

3. The imaging system of claim 2, wherein one or more of said shifting elements comprise an optical-path-length-altering element disposed in the optical path of light propagating through a corresponding microscope for altering the optical path length thereof.

4. The imaging system of claim 3, wherein said optical-path-length-altering element displaces another medium and comprises material whose index of refraction is different from the medium it displaces.

5. The imaging system of claim 3, wherein said optical-path-length-altering element comprises a plane parallel plate.

6. The imaging system of claim 5, wherein at least one of two parallel surfaces of said plane parallel plate has an anti-reflection coating disposed thereon.

7. The imaging system of claim 5, wherein the index of refraction of said plane parallel plate is different than the index of refraction of the medium it displaces.

8. The imaging system of claim 7, wherein the medium displaced by the plane parallel plate is air, and the plane parallel plate has an index of refraction greater than one.

9. The imaging system of claim 3, wherein at least two of said optical-path-length-altering devices is disposed on a common support member.

10. The imaging system of claim 9, wherein said support member comprises a substantially-optically-transparent material disposed in the paths of a plurality of microscopes, the index of refraction of the material being different than the medium it displaces, and said plurality of optical-path-length-altering devices comprise areas of selected thickness corresponding to respective microscopes for varying the optical path length of those areas.

11. The imaging system of claim 10, wherein said support member is made of the same material as the optical-path-length-altering devices.

12. The imaging system of claim 10, wherein said support member and said optical-path-length-altering devices are fabricated by any of diamond turning, molding, embossing, and etching.

13. The imaging system of claim 10, wherein an anti-reflection coating is disposed on at least one surface of said support member.

14. The imaging system of claim 3, wherein said image position lies on a substantially planar surface.

15. A focus compensation system for selectively adjusting the optimal image surface locations of a plurality of optical imaging elements in a multi-axis imaging system wherein the imaging elements are microscopes, each said microscope mapping at least two distinct points of an object to corresponding distinct points in the image produced by the microscope, the compensation system comprising a plurality of image position shifting elements corresponding to a respective plurality of microscopes having respective optical axes and being individually disposed with respect to one another to image respective sections of an object, said image position shifting elements providing different optical path lengths along the optical axes of respective microscopes so as to establish the positions of the image surfaces.

16. The focus compensation system of claim 15, wherein said image position shifting elements are particularly adapted for use with a miniaturized microscope array.

17. The focus compensation system of claim 16, wherein one or more of said shifting elements comprise an optical-path-length-altering element disposed in the optical path of light propagating through a corresponding microscope for altering the optical path length thereof.

18. The focus compensation system of claim 17, wherein said optical-path-length-altering element comprises a plane parallel plate.

19. The focus compensation system of claim 17, wherein at least two of said optical-path-length-altering elements are disposed on a common support member.

20. The focus compensation system of claim 19, wherein said microscopes comprise miniature microscopes, said image shifting elements comprise a substantially-optically-transparent material disposed in the paths of said miniature microscopes, and said plurality of optical-path-length-altering elements comprise areas of selected thickness corresponding to respective miniaturized microscopes for varying the optical path length of those areas.

21. The focus compensation system of claim 20, wherein said support member is made of the same material as the optical-path-length-altering elements.

22. The focus compensation system of claim 20, wherein said support member and said optical-path-length-altering elements are fabricated by any of diamond turning, molding, embossing, and etching.

23. The focus compensation system of claim 19, wherein an anti-reflection coating is disposed on at least one surface of the support member.

24. A method for selectively adjusting the image positions of a plurality of optical imaging elements in a multi-axis imaging system wherein the imaging elements are microscopes, each said microscope mapping at least two distinct points of an object to corresponding distinct points in the image produced by the microscope, the method comprising inserting one or more image shifting elements into the optical axes of respective microscopes so as to introduce different optical path lengths along the optical axes of respective microscopes and thereby establish the image positions thereof.

25. The method of claim 24, further comprising using the multi-axis imaging system to image multiple sections of a common specimen.

26. The method of claim 25, further comprising providing as the image shifting elements one or more plane parallel plates whose indices of refraction are different from the index of refraction of the medium displaced by the plan parallel plate.

27. The method of claim 25, further comprising providing as the image shifting elements a compensator member having a plurality of regions of respective uniform thickness corresponding to respective elements of the plurality of microscopes.

28. The method of claim 24, further comprising providing as the image shifting elements one or more plane parallel plates whose indices of refraction are different from the index of refraction of the medium displaced by the plane parallel plate.

29. The method of claim 24, further comprising providing as the image shifting elements a compensator member having a plurality of regions of respective uniform thickness corresponding to respective elements of the plurality of microscopes.

30. A multi-axis imaging system, comprising:
a plurality of optical imaging elements arranged in an array, the imaging elements being microscopes having respective optical axes and being individually disposed with respect to one another to image respective sections of an object such that at least two distinct points within each said section of the object are mapped by the respective microscope to corresponding distinct points in the image produced by the respective microscope; and
an image position shifting device having a plurality of distinct portions corresponding to selected microscopes for separately translating the actual image positions of said selected microscopes to establish the image positions thereof.

31. The imaging system of claim 30, wherein said plurality of microscopes comprises a miniature microscope array.

32. The imaging system of claim 31, wherein one or more of said distinct portions comprise an optical-path-length-altering element disposed in the optical path of light propagating through a corresponding microscope for altering the optical path length thereof.

33. The imaging system of claim 32, wherein said optical-path-length-altering element displaces another medium and comprises material whose index of refraction is different from the medium it displaces.

34. The imaging system of claim 32, wherein said optical-path-length-altering element comprises a plane parallel plate.

35. The imaging system of claim 34, wherein at least one of two parallel surfaces of said plane parallel plate has an anti-reflection coating disposed thereon.

36. The imaging system of claim 34, wherein the index of refraction of said plane parallel plate is different than the index of refraction of the medium it displaces.

37. The imaging system of claim 36, wherein the medium displaced by the plane parallel plate is air, and the plane parallel plate has an index of refraction greater than one.

38. A focus compensation system for individually adjusting the optimal image plane location of a plurality of optical imaging elements in a multi-axis imaging system wherein the optical imaging elements are microscopes, each said microscope mapping at least two distinct points of an object to corresponding distinct points in the image produced by the microscope, the compensation system comprising an image shifting device having a plurality of distinct portions corresponding to a respective plurality of microscopes having respective optical axes and being individually disposed with respect to one another to image respective sections of an object, two or more of said portions of said image position shifting device introducing different optical path lengths along the optical axes of their respective microscopes so as to establish the image planes therefor.

39. The focus compensation system of claim 38, wherein said image position shifting device is particularly adapted for use with a miniaturized microscope array.

40. The focus compensation system of claim 39, wherein one or more of said distinct portions comprise optical-path-length-altering elements disposed in the optical path of light propagating through a corresponding microscope for altering the optical path length thereof.

41. The focus compensation system of claim 40, wherein said optical-path-length-altering element comprises a plane parallel plate.

42. The focus compensation system of claim 40, wherein at least two of said optical-path-length-altering elements are disposed on a common support member.

43. The focus compensation system of claim 42, wherein said optical elements comprise miniature microscopes, said image shifting device comprises a substantially-optically-transparent material disposed in the paths of said miniature microscopes, and said plurality of optical-path-length-altering elements comprise areas of selected thickness corresponding to respective miniaturized microscopes for varying the optical path length of those areas.

44. The focus compensation system of claim 43, wherein said support member is made of the same material as the optical-path-length-altering elements.

45. The focus compensation system of claim 43, wherein said support member and said optical-path-length-altering elements are fabricated by any of diamond turning, molding, embossing, and etching.

46. The focus compensation system of claim 42, wherein an anti-reflection coating is disposed on at least one surface of the support member.

47. A method for separately adjusting the image positions of a plurality of optical imaging elements in a multi-axis imaging system wherein the optical imaging elements are microscopes, each said microscope mapping at least two distinct points of an object to corresponding distinct points in the image produced by the microscope, the method comprising inserting an image shifting device into the optical axes of a plurality of respective said microscopes so that at least two distinct portions of said image shifting device introduce different optical path lengths along the optical axes of respective microscopes for separately establishing the positions of the image surfaces.

48. The method of claim 47, further comprising using the multi-axis imaging system to image multiple sections of a common specimen.

49. The method of claim 48, further comprising providing as the distinct portions one or more plane parallel plates whose indices of refraction are different from the index of refraction of the medium displaced by the plane parallel plate.

50. The method of claim 48, further comprising providing as the image shifting devices a compensator member having a plurality of distinct portions having respective uniform thicknesses corresponding to respective elements of the plurality of microscopes.

51. The method of claim 47, further comprising providing as the distinct portions wavelength filters having different pass bands for altering the image position based on wavelength.

52. The method of claim 47, further comprising providing as the distinct portions one or more plane parallel plates whose indices of refraction are different from the index of refraction of the medium displaced by the plane parallel plate.

53. The method of claim 47, further comprising providing as the image shifting device a compensator member having a plurality of distinct portions having respective uniform thicknesses corresponding to respective elements of the plurality of microscopes.

* * * * *